United States Patent
Katzenstein et al.

(10) Patent No.: US 10,612,193 B2
(45) Date of Patent: Apr. 7, 2020

(54) PAPER COATED WITH A FUNCTIONAL POLYOLEFIN FILM

(71) Applicant: Dow Global Technologies LLC, Midland, MI (US)

(72) Inventors: Joshua M. Katzenstein, Midland, MI (US); Jay D. Romick, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 31 days.

(21) Appl. No.: 16/005,786

(22) Filed: Jun. 12, 2018

(65) Prior Publication Data
US 2018/0363248 A1 Dec. 20, 2018

Related U.S. Application Data

(60) Provisional application No. 62/520,073, filed on Jun. 15, 2017.

(51) Int. Cl.

| D21H 27/10 | (2006.01) |
|---|---|
| D21H 19/20 | (2006.01) |
| D21H 17/37 | (2006.01) |
| D21H 19/58 | (2006.01) |
| C09D 133/10 | (2006.01) |
| D21H 21/16 | (2006.01) |
| C08F 210/16 | (2006.01) |
| C08F 220/18 | (2006.01) |
| C08K 3/28 | (2006.01) |
| C08K 5/17 | (2006.01) |

(52) U.S. Cl.
CPC .......... *D21H 19/20* (2013.01); *C09D 133/10* (2013.01); *D21H 17/37* (2013.01); *D21H 19/58* (2013.01); *C08F 210/16* (2013.01); *C08F 220/18* (2013.01); *C08F 2500/12* (2013.01); *C08F 2800/20* (2013.01); *C08K 3/28* (2013.01); *C08K 5/17* (2013.01); *C08L 2203/16* (2013.01); *C08L 2205/03* (2013.01); *D21H 21/16* (2013.01); *D21H 27/10* (2013.01)

(58) Field of Classification Search
USPC ..................................................... 162/158.1
See application file for complete search history.

(56) References Cited

U.S. PATENT DOCUMENTS

| 3,325,431 | A | 6/1967 | McManus |
|---|---|---|---|
| 3,440,194 | A | 4/1969 | Taranto et al. |
| 3,541,035 | A | 11/1970 | Baum |
| 5,837,383 | A | 11/1998 | Wenzel et al. |
| 7,803,865 | B2 | 9/2010 | Moncla et al. |
| 8,722,787 | B2 | 5/2014 | Romick et al. |
| 2005/0100754 | A1 | 5/2005 | Moncla et al. |
| 2006/0063877 | A1 | 3/2006 | Gaschler et al. |
| 2007/0232743 | A1 | 10/2007 | Laviolette et al. |
| 2011/0027601 | A1 | 2/2011 | Ruffner, Jr. et al. |
| 2011/0293851 | A1 | 12/2011 | Bollstrom et al. |
| 2011/0308751 | A1 | 12/2011 | Moncla et al. |
| 2012/0171440 | A1 | 7/2012 | Desai et al. |
| 2013/0149453 | A1 | 6/2013 | Romick et al. |
| 2015/0203615 | A1 | 7/2015 | Hayes |
| 2016/0145806 | A1 | 5/2016 | Rhee |
| 2016/0177075 | A1 | 6/2016 | Crimmins et al. |

FOREIGN PATENT DOCUMENTS

| CN | 105463939 | 4/2016 |
|---|---|---|
| JP | 2013249069 | 12/2013 |
| WO | 2014178000 | 11/2014 |

OTHER PUBLICATIONS

Search report from corresponding European 18177424.1 application, dated Oct. 24, 2018.

*Primary Examiner* — Mark Halpern
(74) *Attorney, Agent, or Firm* — Reid S. Willis

(57) ABSTRACT

The present invention relates to an article and a method for its preparation; the article comprises a cured polymeric film superposing paper or paperboard. The polymeric film comprises:

a) a base polymer comprising structural units of ethylene and a $C_1$-$C_{12}$-alkyl acrylate or methacrylate, wherein the weight-to-weight ratio of the structural units of ethylene and the $C_1$-$C_{12}$-alkyl acrylate or methacrylate is in the range of from 99.8:0.2 to 50:50; and b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 75:25;

wherein the dispersant has a concentration in the range of from 9 to 50 weight percent based on the weight of the cured film; and wherein the sum of the dispersant and the base polymer comprise from 10 to 100 percent of the weight of cured film.

The article of the present invention is useful as a barrier to a wide range of hydrophobic and hydrophilic materials.

8 Claims, No Drawings

PAPER COATED WITH A FUNCTIONAL POLYOLEFIN FILM

BACKGROUND OF THE INVENTION

The present invention relates to an article comprising paper coated with an aqueous dispersion of polyolefin particles as well as paper coated with a polyolefin film arising from this dispersion.

Coating of paper or paperboard for use in a range of applications is known to provide barriers to a wide range of substances including water, oil, and acids. Typically, high performance coatings, such as those used for paper drink cups, are prepared by extrusion coating or lamination of a melted polyolefin resin directly onto the paper. This process provides continuous coverage over the substrate and prevents liquid placed into the cup from either contaminating the paper or soaking through completely, thereby causing structural failure of the article. Despite the excellent barrier properties of these extrusion coatings, however, limitations in state-of-the extrusion methods require a coating layer that is much thicker than necessary to achieve the desired barrier properties; therefore, polyolefin is wasted. Currently coatings produced by extrusion have a coat weight of at least 15 g/m², when a significantly lower coat weight is sufficient.

Liquid applied barrier coatings for paper and paperboard have been described in the art. For example, Application No. U.S. 2006/0063877 describes an aqueous dispersion of an olefin copolymer that is useful in paper coating applications to improve brightness. Application No. U.S. 2016/0145806 discloses a dispersible ethylene-(meth)acrylic acid co-polymer for use as a water-repellency layer. Nevertheless, the invention requires separate layers to achieve a broad range of barriers to hydrophobic and hydrophilic materials.

Accordingly, it would be an advance in the art of coated paper or paperboard to reduce the amount of a polymeric barrier layer applied to the substrate without adversely affecting performance.

SUMMARY OF THE INVENTION

The present invention addresses a need by providing, in one aspect, a process for preparing an omniphobic single layered coating onto paper or paperboard comprising the steps of:
  a) applying onto paper or paperboard a composition comprising water, a dispersant, a base polymer, and a neutralizing agent; and
  b) heating the composition to produce a cured film having a coat weight density in the range of 1 to 20 g/m²;
wherein the sum of the dispersant and the base polymer comprise from 10 to 100 percent of the weight of cured film; wherein
the dispersant is a copolymer comprising structural units of ethylene and a carboxylic acid monomer, wherein the copolymer has a melt flow index in the range of from 50 to 2000 g/10 min at 190° C.; wherein the weight-to-weight ratio of structural units of ethylene to carboxylic acid monomer is in the range of from 95:5 to 70:30; and wherein the dispersant has a concentration in the range of from 9 to 50 weight percent based on the weight of the cured film;
the base polymer comprises structural units of ethylene and a $C_1$-$C_{12}$-alkyl acrylate or methacrylate, wherein the weight-to-weight ratio of the structural units of ethylene to the $C_1$-$C_{12}$-alkyl acrylate or methacrylate is in the range of from 99.8:0.2 to 50:50;
wherein the neutralizing agent is ammonia or an organic base having a boiling point of less than 250° C.; wherein the concentration of the neutralizing agent is sufficient to neutralize at least half of the carboxylic acid groups associated with the dispersant.

In a second aspect, the present invention is an article comprising from 1 to 12 g/m² of a cured polymeric film superposing paper or paperboard, wherein the polymeric film comprises:
a) a base polymer comprising structural units of ethylene and a $C_1$-$C_{12}$-alkyl acrylate or methacrylate, wherein the weight-to-weight ratio of the structural units of ethylene to the $C_1$-$C_{12}$-alkyl acrylate or methacrylate is in the range of from 99.8:0.2 to 50:50; and
b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 70:30;
wherein the dispersant has a concentration in the range of from 9 to 50 weight percent based on the weight of the cured film; and wherein the sum of the dispersant and the base polymer comprise from 10 to 100 percent of the weight of cured film.

The present invention provides a way to prepare a coated paper or paperboard with a relatively thin coating of an omniphobic barrier layer that maintains stain resistance to a wide variety of substances

DETAILED DESCRIPTION OF THE INVENTION

In a first aspect, the present invention is a process for preparing an omniphobic single layered coating onto paper or paperboard comprising the steps of:
  a) applying onto paper or paperboard a composition comprising water, a dispersant, a base polymer, and a neutralizing agent; and
  b) heating the composition to produce a cured film having a coat weight density in the range of 1 to 20 g/m²;
wherein the dispersant and the sum of the base polymer comprise from 10 to 100 percent of the weight of cured film; wherein
the dispersant is a copolymer comprising structural units of ethylene and a carboxylic acid monomer, wherein the copolymer has a melt flow index in the range of from 50 to 2000 g/10 min at 190° C.; wherein the weight-to-weight ratio of structural units of ethylene to carboxylic acid monomer is in the range of from 95:5 to 70:30; and wherein the dispersant has a concentration in the range of from 9 to 50 weight percent based on the weight of the cured film;
the base polymer comprises structural units of ethylene and a $C_1$-$C_{12}$-alkyl acrylate or methacrylate, wherein the weight-to-weight ratio of the structural units of ethylene and the $C_1$-$C_{12}$-alkyl acrylate or methacrylate is in the range of from 99.8:0.2 to 50:50;
wherein the neutralizing agent is ammonia or an organic base having a boiling point of less than 250° C.; wherein the concentration of the neutralizing agent is sufficient to neutralize at least half of the carboxylic acid groups associated with the dispersant.

The composition, which is an aqueous dispersion comprising the dispersant, the base polymer, and the neutralizing agent may be prepared by a continuous or batch process. An example of a preferred continuous process is twin screw extrusion, as described in U.S. Pat. No. 8,722,787, Comparative Example E. A batch process can be carried out, for example, using a 2CV Helicone mixer, which is a conical batch mixer that uses dual intermeshing conical blades to mix high viscosity materials. The concentration of polymers in the aqueous dispersion is preferably in the range from 20, more preferably from 25, and most preferably from 30 weight percent, to preferably 50 and more preferably to 45 weight percent, based on the concentration of water and the polymers.

The dispersant is a copolymer comprising structural units of ethylene and a carboxylic acid monomer such as acrylic acid, methacrylic acid, or itaconic acid. As used herein, the term "structural unit" of the named monomer refers to the remnant of the monomer after polymerization. For example, a structural unit of methyl methacrylate is as illustrated:

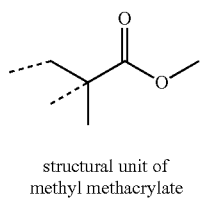

structural unit of
methyl methacrylate where the dotted lines represent the points of attachment of the structural unit to the polymer backbone.

The copolymer has a melt flow index in the range of from 50 to 2000 g/10 min at 190° C. (according to ASTM D1238) and the weight-to-weight ratio of structural units of ethylene to carboxylic acid monomer is in the range of from 95:5, preferably from 90:10, and more preferably from 85:15 weight percent; to 70:30, and preferably to 75:25 weight percent, based on the weight of the dispersant. The concentration of the dispersant is preferably in the range of from 10, more preferably from 15 weight percent, to preferably to 40, more preferably to 30 weight percent, based on the weight of the cured film. Examples of suitable commercially available dispersants include PRIMACOR™ 5980i Copolymer and NUCREL™ 2806 Copolymer (A Trademark of The Dow Chemical Company or its Affiliates).

The base polymer is a copolymer comprising structural units of ethylene and a $C_1$-$C_{12}$-alkyl acrylate or methacrylate, wherein the weight-to-weight ratio of the structural units of ethylene to the $C_1$-$C_{12}$-alkyl acrylate or methacrylate is in the range of from 99.8:0.2, preferably from 99.7:0.3; and more preferably from 99.6:0.4; to 50:50, more preferably to 60:40; and most preferably to 65:35. Preferred base polymers include ethylene-co-methyl acrylate; ethylene-co-ethyl acrylate; and ethylene-co-butyl acrylate. The concentration of base polymer in the composition is sufficient to form a cured film with a Cobb value of less than 10 g/m² and oil contamination of less than 10 percent, preferably less than 5 percent, more preferably 0 percent. Preferably, the concentration of the base polymer is preferably in the range of from 1, more preferably from 2, to 90, more preferably to 80, and most preferably to 75 weight percent, based on the weight of the cured film. Commercial examples of base polymers include: AMPLIFY™ EA103 Functional Polymer, ELVALOY™ AC34035 Ethylene butyl acrylate copolymer; and AC1609 Ethylene methyl acrylate copolymer. (AMPLIFY and ELVALOY are Trademarks of The Dow Chemical Company or its Affiliates.)

The neutralizing agent is an organic base having a boiling point of less than 250° C., preferably ammonia or an amine; examples of suitable amines such as N,N-dimethylethanolamine, diethylamine, and morpholine. The concentration of neutralizing agent is sufficiently high to neutralize at least half of the carboxylic acid groups in the dispersant. For example, if the dispersant comprises 0.05 mol of carboxylic acid groups, at least 0.025 mol of an amine such as N,N-dimethylethanolamine would be required. Thus, the ratio of base functionality in the neutralizing agent, preferably amine groups or ammonia, to carboxylic acid groups in the dispersant is at least 0.5:1. Preferably the ratio is in the range of from 0.7:1, more preferably from 0.9:1, and more preferably from 1.1:1, to preferably 3:1, and more preferably to 2.5:1.

The composition may comprise other components including polymeric coupling agents to improve the compatibility between the dispersant and the base polymer. An example of a suitable coupling agent includes ethylene-co-maleic anhydride, which, when used, is present at a concentration in the range of from 5 weight percent to 20, more preferably to 10 weight percent based on the weight the cured film.

The composition may further comprise non-functionalized ethylene-co-alkene copolymers such as ethylene-co-octene or ethylene-co-hexene copolymers. These non-functionalized copolymers may be used at a concentration of up to 85 weight percent, based on the weight of the cured film.

The composition may also comprise up to 5 weight percent, based the weight of the cured film, of a wax such as ethylene bis(stearamide) and polyolefin waxes such as the commercially available Polywax 655 Polyethylene.

The composition can be applied to paper or paperboard using a wire wound drawdown bar. The wet film can then heated to remove water, preferably to a temperature in the range of from 50° C., more preferably from 70° C. to preferably 150° C., more preferably 120° C. to provide a coat weight density of from 1, preferably from 2, more preferably from 4, and most preferably from 6 g/m², to 20, preferably to 15, more preferably to 12, and most preferably 10 g/m². It is desirable in practice to remove as much neutralizing agent as possible during the heating (curing) process. The paper or paperboard may be uncoated, or pre-coated to create a smooth surface.

It has been discovered that a very thin layer of a film with low water uptake and high oil resistance (an omniphobic film) can be coated onto paper or paperboard; moreover, the application can be done in a single pass because the omniphobic properties are present in base polymer and the dispersant in the applied aqueous composition. It has been surprisingly discovered that even a low concentration of acrylate or methacrylate functionality in the base polymer results in the difference between an effective omniphobic layer and an ineffective one.

EXAMPLES

Sample Preparation

Coating formulations were prepared by diluting polyolefin dispersion compositions to the desired solids formulation using 0.3 wt. % N,N-dimethylethanolamine in deionized water. The substrate was 203 g/m² uncoated solid bleached sulphate (SBS) paperboard. Coatings of paper and paperboard samples were prepared using an Elcometer 4340 Motorised Film Applicator automatic coater with either a #10, #12, or #30 wire-wound drawdown bar. Samples were cured in a Fisher Scientific Isotemp 180 L Oven FA oven at either 80° C. or 110° C. for 2 min.

Coat Weight Measurements

The coat weight of samples was measured by cutting out 7.17 in² (46.26 cm²) sections coated and uncoated paper, then placing the sections in an oven at 80° C. for 2 min. All the samples were then weighed and the coat weight was determined by the difference between the coated and uncoated samples.

Water Uptake Measurements

Water uptake testing was performed in a modified version of TAPPI method T441 "Water absorptiveness of sized (non-bilious) paper, paperboard, and corrugated fiberboard (Cobb test)." Samples of coated paper or paperboard were prepared using the above method and then cut into 25-cm$^2$ round samples using a circular die and pneumatic press. A round sample was placed in an oven at 80° C. for 2 min, then removed and weighed, then placed on a rubber mat; a circular metal ring was affixed on top of the round sample and clamped to prevent water leakage. Water at 90° C. was then poured over the sample to a height of 1 cm (25 mL of test liquid) and allowed to stand for 2 min. At the end of the test period, the test liquid was poured off and the coated sample was placed between two sheets of blotter paper. A 10-kg metal roller was passed over the sample twice. Finally, the sample was weighed and the water uptake was calculated based on the difference in mass between the exposed and unexposed sample.

Oil and Grease Resistance Measurements

Oil and grease resistance of coatings was performed using a modified Ralston Purina 2 test method. The coated paper or paperboard was cut into a 2"×2" square test sample and weighed. The test sample was placed on a sheet of standard graph paper with a ¼" grid, which paper was fixed on a metal sheet. Two 1" cotton flannel rounds saturated with vegetable oil were placed in the center of the coated paper or paperboard. The rounds were held in place by a brass weight with a diameter and a length of 1 inch. Samples of coated paper and paperboard cut to the same dimensions were also placed on the metal sheet to measure water loss by the paper substrate during subsequent heat aging. The samples were heat-aged in an oven at 60° C. for 24 h, after which time the samples were allowed to cool to room temperature. The weight and the cotton rounds were removed and excess oil was blotted off with a paper towel. Finally, the samples were weighed and the oil uptake (in g/m$^2$) was calculated based on mass difference correcting for water loss; the graph paper was examined to determine the percentage of the squares contaminated by oil breakthrough.

In the following examples and comparative example, EA103 refers to AMPLIFY™ EA103 Functional Polymer; 5980i refers to PRIMACOR™ 5980i Copolymer; DMEA refers to dimethylethanolamine; MA-co-PE refers to Licocene 431 Stabilized maleic anhydride grafted polyethylene wax; 8401 refers to ENGAGE™ 8401 Polyolefin Elastomer; 8402 refers to ENGAGE™ 8402 Polyolefin Elastomer; AC34035 refers to Elvaloy AC34035 Ethylene butyl acrylate copolymer; AC1609 refers to Elvaloy AC1609 Ethylene methyl acrylate copolymer. (PRIMACOR and ENGAGE are Trademarks of The Dow Chemical Company or its Affiliates.)

Example 1—Preparation of an Aqueous Dispersion of a Base Polymer and a Dispersant at a 75:25 w/w Ratio The melt chamber of a 2CV Helicone mixer was preheated to 90° C. and then loaded with EA103 (60.03 g) and 5980i (20.02 g), for a mix composition of 75.0% EA103, and 25.0% 5980. Deionized water (22.54 mL) and of DMEA (11.46 mL, 200% neutralization) were also pre-loaded using an ISCO syringe pump. The components in the melt chamber were heated to 152° C., at which temperature the mixer was started; the initial mixing speed was maintained at 43 rpm for 5 min then raised to 98 rpm for the remainder of the run. The material was white and uniform after 30 min of mixing. Dilution water was added with an ISCO pump at the rate of 1 mL/min for 30 min, then 1.5 mL/min for 55 min. After the dilution was finished, the mixer was turned off and the contents were cooled. Once the temperature of the contents reached 91.5° C., and the pressure in the chamber was slowly vented. The gate valve was opened and the material was collected (206.3 g, 91.6% recovery) and filtered before use.

Example 2—Preparation of an Aqueous Dispersion of Base Polymer, Dispersant, and Polymeric Coupling Agent at a 65:25:10 w/w/w Ratio The melt chamber of the 2CV Helicone mixer was preheated to 90° C. and then loaded with EA103 (51.99 g), MA-co-PE polymeric coupling agent (8.00 g), and 5980i (20.02 g), for a mix composition of 65.0% EA103, 10.0% MA-co-PE, and 25.0% 5980i. Deionized water (22.83 mL) and DMEA (12.71 mL, 200% neutralization) were also pre-loaded using an ISCO syringe pump. The components in the melt chamber were heated 143° C., at which temperature the mixer was started; the initial mixing speed was maintained at 43 rpm for 5 min then raised to 98 rpm for the remainder of the run. The material was white and uniform after 30 min of mixing. Dilution water was added with an ISCO pump at the rate of 1 mL/min for 30 min, then 1.5 mL/min for 56 min. The dilution was paused for 8 min during the second part of the addition. After the dilution was complete, the mixer was turned off and the contents were cooled. Once the temperature of the contents reached 88.6° C., the pressure in the chamber was slowly vented. The gate valve was opened and the material was collected (188.90 g, 82.8% recovery) and filtered before use.

Example 3—Preparation of an Aqueous Dispersion of Base Polymer, Dispersant, Polymeric Coupling Agent, and 8401 at a 26:25:10:39 w/w/w/w Ratio EA103 (26 weight percent of polymer solids), 5980i (25 weight percent of polymer solids), MA-co-PE (10 weight percent of polymer solids), and 8401 (39 weight percent of polymer solids) were fed individually and concurrently from separate hoppers at the specified relative weights at a rate of 15 lbs/h (6.8 kg/h) into a 25 mm Bersdorff ZE25 UTX extruder with 48 L/D (rotating at 300 rpm). The extruder temperature profile was ramped to 150° C. prior to the introduction, through ISCO pumps, of water (14.3 mL/min at 123° C. and 485 psi) and DMEA (17.7 mL/min) separately and concurrently. Dilution water (115 mL/min at 143° C. and 650 psi) was then added and the mixture was cooled to 97° C. at the extruder outlet. A back-pressure regulator was used at the extruder outlet to adjust the pressure in the extruder barrel to reduce steam formation. The resulting dispersion was cooled and filtered through a 200-μm filter.

Example 4—Preparation of an Aqueous Dispersion of Base Polymer, Dispersant, and Polymeric Coupling Agent at a 65:25:10 w/w/w Ratio This example was carried out substantially as described in Example 2 except that AC34035 (52.02 g) was used in place of EA103. The dispersion (200.83 g, 88.01% recovery) was collected and the material was filtered before use.

Example 5—Preparation of an Aqueous Dispersion of Base Polymer, Dispersant, and Polymeric Coupling Agent at a 65:25:10 w/w/w Ratio This example was prepared substantially as described for Example 2. After the pressure in the chamber was slowly vented, the gate valve was opened and the material was collected (208.16 g, 91.23% recovery) as a foamy dispersion, which was filtered before use to remove foamy material from the top of the dispersion.

Comparative Example 1—Preparation of Non-Functionalized Base Polymer and Dispersant The melt chamber of the 2CV Helicon mixer was preheated to 90° C. and then loaded with 8402 (60.02 g) and 5980i (20.01 g), for a mix composition of 75.0% 8401 and 25.0% 5980i. Deionized water (22.54 mL) and DMEA (11.43 mL, 200% neutralization) were also pre-loaded using an ISCO syringe pump. The temperature setting was then raised to 155° C., achieving an internal temperature of 143° C. for the run. The initial mixing speed of 5 rpm was maintained for 15 min, then increased to 43 rpm and held for 5 minutes at 143° C. before raising the mixer speed to 98 rpm for the remainder of the run. The material was white and uniform after 30 min of mixing. Dilution water was added at 1 mL/min for 30 min and then 1.5 mL/min for 55 min for a total of 112.5 mL of dilution. After the dilution was finished, the heater was turned down to 90° C. and the mixing speed reduced back to 5 rpm during the cooling process. Once the internal temperature reached 87.5° C., the mixer was stopped and the pressure in the chamber was slowly vented. The gate valve was opened and the material was collected (206.04 g, 91.5% recovery) and the sample was filtered before use.

Table 1 illustrates a summary of the sample compositions

TABLE 1

Sample Compositions

| Example | Base Polymer (wt %) | Dispersant (wt %) | Coupling Agent (wt. %) | Non-Functionalized Olefin (wt. %) |
|---|---|---|---|---|
| 1 | EA103 (75%) | 5980i (25%) | None | None |
| 2 | EA103 (65%) | 5980i (25%) | MA-co-PE (10%) | None |
| 3 | EA103 (26%) | 5980i (25%) | MA-co-PE (10%) | 8401 (39%) |
| 4 | AC34035 (65%) | 5980i (25%) | MA-co-PE (10%) | None |
| 5 | AC1609 (65%) | 5980i (25%) | MA-co-PE (10%) | None |
| Comp. 1 | 8402 (75%) | 5980i (25%) | None | None |

Water Uptake Testing

All samples were cured at 110° C. for 2 min. All Cobb data was generated at 90° C. water for 2 min. The target Cobb value for water uptake was <10 g/m². Table 2 illustrates the coat weights and Cobb values for all the samples. EA refers to ethyl acrylate; BA refers to butyl acrylate; and MA refers to methyl acrylate.

TABLE 2

Coat Weights and Cobb Values

| Example No. | Co-monomer | Co-monomer (wt. %) | Coat Weight (g/m²) | Cobb Value (g/m²) |
|---|---|---|---|---|
| 1 | EA | 14.6 | 5.0 | 5.8 |
| 2 | EA | 12.6 | 6.2 | 4.6 |
| 3 | EA | 5.1 | 9.3 | 8.1 |
| 4 | BA | 22.8 | 5.9 | 4.2 |
| 5 | MA | 5.9 | 8.1 | 6.5 |
| Comp. 1 | None | None | 9.4 | 3.1 |

Table 2 shows that all samples, including the comparative sample, passed the water uptake test for coat weights less than 10 g/m².

Oil and Grease Resistance Testing

All samples were cured at 110° C. for 2 min. The target value for oil uptake was <15 g/m² and the target value for contamination was 0%. Table 3 is a summary of the oil uptake and contamination for the samples. Example 6 was prepared by blending 3.42 g of the dispersion from Example 1 with 36.58 g of Comparative Example 1; Example 7 was prepared by blending 0.68 g of the dispersion from Example 3 with 39.32 g of the dispersion from Comparative Example 1.

TABLE 3

Oil Uptake and Contamination Data

| Example No. | Co-monomer (wt. %) | Coat Weight (g/m²) | Oil Uptake (g/m²) | Contamination (%) |
|---|---|---|---|---|
| 1 | 14.6 | 7.8 | 4.4 | 0 |
| 2 | 12.6 | 9.8 | 0.9 | 0 |
| 3 | 5.1 | 9.0 | 2.7 | 0 |
| 4 | 22.8 | 9.0 | 10.6 | 0 |
| 5 | 5.9 | 8.7 | 1.3 | 0 |
| 6 | 0.5 | 8.3 | 1.0 | 0 |
| 7 | 0.1 | 6.2 | 49.3 | 43.8 |
| Comp. 1 | None | 7.7 | 47.4 | 93.7 |

Table 3 shows that the coated paper samples prepared from dispersions containing polyolefin copolymers functionalized with a sufficient concentration of co-acrylate passed the oil uptake and contamination tests; however, the coated paper sample prepared with the dispersion containing only polyolefin not functionalized with an alkylacrylate failed both tests.

The invention claimed is:

1. A process for preparing an omniphobic single layered coating onto paper or paperboard comprising the steps of:
   a) applying onto paper or paperboard a composition comprising water, a dispersant, a base polymer, and a neutralizing agent; and
   b) heating the composition to produce a cured film having a coat weight density in the range of 1 to 20 g/m²;
   wherein the sum of the dispersant and the base polymer comprise from 10 to 100 percent of the weight of cured film; wherein
   the dispersant is a copolymer comprising structural units of ethylene and a carboxylic acid monomer, wherein the copolymer has a melt flow index in the range of from 50 to 2000 g/10 min at 190° C.; wherein the weight-to-weight ratio of structural units of ethylene to carboxylic acid monomer is in the range of from 95:5 to 70:30; and wherein the dispersant has a concentration in the range of from 9 to 50 weight percent based on the weight of the cured film;

the base polymer comprises structural units of ethylene and a $C_1$-$C_{12}$-alkyl acrylate or methacrylate, wherein the weight-to-weight ratio of the structural units of ethylene to the $C_1$-$C_{12}$-alkyl acrylate or methacrylate is in the range of from 99.8:0.2 to 50:50;

wherein the neutralizing agent is ammonia or an organic base having a boiling point of less than 250° C.; wherein the concentration of the neutralizing agent is sufficient to neutralize at least half of the carboxylic acid groups associated with the dispersant.

2. The process of claim 1 wherein the cured film has a coat weight density in the range of from 2 to 12 g/m²; wherein the dispersant is a copolymer of ethylene and acrylic acid or methacrylic acid;

the base polymer is ethylene-co-methyl acrylate, ethylene-co-ethyl acrylate, or ethylene-co-butyl acrylate; and the neutralizing agent is ammonia or an amine.

3. The process of claim 2 wherein the cured film has a coat weight density in the range of from 4 to 10 g/m², wherein the weight-to-weight ratio of structural units of ethylene to structural units of acrylic acid or methacrylic acid is in the range of from 90:10 to 75:25; and the concentration of the dispersant is in the range of from 10 to 40 percent based on the weight of the cured film.

4. The process of claim 3 wherein the concentration base polymer is in the range of from 1 to 75 weight percent, based on the weight of the cured film.

5. The process of claim 4 wherein the composition further comprises up to 85 weight percent of an ethylene-co-octene or an ethylene-co-hexene copolymer, based on the weight of the cured film.

6. The process of claims 4 wherein the composition further comprises up to 5 weight percent of a wax, based on the weight of the cured film.

7. The process of claim 1 wherein the composition further comprises from 5 to 10 weight percent of a polymeric coupling agent, based on the weight of the cured film.

8. An article comprising from 1 to 12 g/m² of a cured polymeric film superposing paper or paperboard, wherein the polymeric film comprises:

a) a base polymer comprising structural units of ethylene and a $C_1$-$C_{12}$-alkyl acrylate or methacrylate, wherein the weight-to-weight ratio of the structural units of ethylene and the $C_1$-$C_{12}$-alkyl acrylate or methacrylate is in the range of from 99.8:0.2 to 50:50; and b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 70:30;

wherein the dispersant has a concentration in the range of from 9 to 50 weight percent based on the weight of the cured film; and wherein the sum of the dispersant and the base polymer comprise from 10 to 100 percent of the weight of cured film.

* * * * *